(12) United States Patent
Rothschild et al.

(10) Patent No.: US 9,057,544 B2
(45) Date of Patent: Jun. 16, 2015

(54) SOLAR PANEL MOUNTING SYSTEM

(76) Inventors: Elie Rothschild, San Francisco, CA (US); John Humphrey, San Francisco, CA (US); George H. F. Schnakenberg, III, San Francisco, CA (US)

( * ) Notice: Subject to any disclaimer, the term of this patent is extended or adjusted under 35 U.S.C. 154(b) by 566 days.

(21) Appl. No.: 13/471,050

(22) Filed: May 14, 2012

(65) Prior Publication Data

US 2012/0223032 A1    Sep. 6, 2012

Related U.S. Application Data

(63) Continuation-in-part of application No. 12/710,328, filed on Feb. 22, 2010, now Pat. No. 8,567,132.

(60) Provisional application No. 61/154,002, filed on Feb. 20, 2009.

(51) Int. Cl.
| | |
|---|---|
| *A47G 19/08* | (2006.01) |
| *F24J 2/52* | (2006.01) |
| *H01L 31/042* | (2014.01) |
| *H02S 20/24* | (2014.01) |
| *F24J 2/46* | (2006.01) |
| *F24J 2/00* | (2014.01) |

(52) U.S. Cl.
CPC .............. *F24J 2/5239* (2013.01); *F24J 2/4638* (2013.01); *F24J 2/5237* (2013.01); *F24J 2002/0038* (2013.01); *F24J 2002/5279* (2013.01); *Y02E 10/47* (2013.01); *Y02E 10/50* (2013.01); *H02S 20/00* (2013.01); *H02S 20/24* (2014.12)

(58) Field of Classification Search
CPC ....... F24J 2/5239; F24J 2/4638; F24J 2/5237; F24J 2002/0038; F24J 2002/5279; Y02E 10/47; Y02E 10/50; H02S 20/00; H02S 20/24
USPC ......... 211/41.1; 136/251, 244, 246; 52/173.1, 52/173.3, 705, 545, 546, 588.1, 200, 52/204.1, 204.55; 24/290, 295, 293, 522
See application file for complete search history.

(56) References Cited

U.S. PATENT DOCUMENTS

| | | | |
|---|---|---|---|
| 5,244,508 | A | 9/1993 | Colozza |
| 5,746,839 | A | 5/1998 | Dinwoodie |
| 5,969,501 | A | 10/1999 | Glidden et al. |
| 6,046,399 | A | 4/2000 | Kapner |
| 6,201,181 | B1 | 3/2001 | Azzam et al. |
| 6,370,828 | B1 * | 4/2002 | Genschorek .................... 52/200 |
| 6,606,823 | B1 | 8/2003 | McDonough et al. |
| RE38,988 | E | 2/2006 | Dinwoodie |

(Continued)

*Primary Examiner* — Korie H Chan
(74) *Attorney, Agent, or Firm* — Mark David Torche; Patwrite LLC (57) ABSTRACT

A solar panel mounting system has a plurality of mounting bases which have upper and lower mounting surfaces. In the minimum configuration, four mounting bases are used. A solar panel module is connected to the top portion of two bases and to the bottom portion so that the solar panel module is mounted at a selected angle. Each of the bases has attachment points which hold insert nuts and allows mounting brackets to be secured along the mounting surfaces. The mounting brackets allow the solar panel modules to be clamped utilizing their frames without additional hardware and to be attached from the top without access to the bottom of the panels. The brackets can be industry standard or specific to the system. The bases stack and nest for easy transport. The mounting bases may be secured to a selected surface using ballasts, mechanical attachments or a combination thereof.

8 Claims, 8 Drawing Sheets

(56) References Cited

U.S. PATENT DOCUMENTS

| | | |
|---|---|---|
| 7,230,819 B2 | 6/2007 | Muchow et al. |
| 7,634,875 B2 * | 12/2009 | Genschorek ................ 52/173.3 |
| 7,780,472 B2 * | 8/2010 | Lenox ........................ 439/567 |
| 7,971,398 B2 * | 7/2011 | Tweedie ..................... 52/173.3 |
| 8,092,129 B2 * | 1/2012 | Wiley et al. ................. 411/160 |
| 8,894,424 B2 * | 11/2014 | Dupont ........................ 439/95 |
| 2003/0070368 A1 * | 4/2003 | Shingleton ................. 52/173.3 |
| 2004/0250491 A1 | 12/2004 | Diaz et al. |
| 2006/0266352 A1 | 11/2006 | Marston et al. |
| 2007/0144575 A1 | 6/2007 | Mascolo et al. |
| 2009/0242014 A1 * | 10/2009 | Leary ......................... 136/251 |
| 2011/0138585 A1 * | 6/2011 | Kmita et al. ................... 24/522 |
| 2011/0203637 A1 * | 8/2011 | Patton et al. ................. 136/244 |
| 2011/0214366 A1 * | 9/2011 | Haddock et al. ............. 52/173.3 |
| 2011/0232212 A1 * | 9/2011 | Pierson et al. ............... 52/173.3 |
| 2013/0091786 A1 * | 4/2013 | Dupont et al. ............... 52/173.3 |

* cited by examiner

SOLAR PANEL MOUNTING SYSTEM

CROSS REFERENCE TO RELATED APPLICATIONS

This is a continuation in part of U.S. patent application Ser. No. 12/710,328 filed Feb. 22, 2010, which in turn claims priority to Provisional Application Ser. No. 61/154,002, filed on Feb. 20, 2009, the complete disclosures of each of which are hereby incorporated by reference.

BACKGROUND OF THE INVENTION

As alternative energy sources become more important to the economic and environmental well-being of society, solar energy use will continue to increase. It is becoming more common to see roofs and other structures having solar panels installed to generate electrical energy. In general, these installations require significant rack systems that may be permanent. These kinds of installations can cause exposure problems to the building due to the required structural penetration to secure the solar panels. Additionally, it is difficult to remove if desired.

To solve this problem, some solar systems utilize racking systems that use ballast to secure them rather than permanent installations. Although this helps in removal and minimizing surface penetrations, it is difficult for such installations to meet strength, reliability, environmental and safety standards while also withstanding wind, rain, temperature variations and solar radiation. Additionally, these racking systems tend to be bulky and complex requiring expert installation done on-site.

There is a need for a solar racking system that is quick and easy to install yet not requiring surface penetration that is also easily removed and roof-friendly.

SUMMARY OF THE INVENTION

A solar panel mounting system has a plurality of mounting bases which have upper and lower mounting surfaces. In the minimum configuration, four mounting bases are used. A solar panel module is connected to the top portion of two bases and to the bottom portion so that the solar panel module is mounted at a selected angle. Each of the bases has attachment points which hold insert nuts and allows mounting brackets to be secured along the mounting surfaces. The mounting brackets allow the solar panel modules to be clamped utilizing their frames without additional hardware and to be attached from the top without access to the bottom of the panels. The brackets can be industry standard or specific to the system. The bases stack and nest for easy transport. The mounting bases may be secured to a selected surface using ballasts, mechanical attachments or a combination thereof.

Other features and advantages of the instant invention will become apparent from the following description of the invention which refers to the accompanying drawings.

DETAILED DESCRIPTION OF THE INVENTION

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to FIGS. 1 through 4, a solar panel mounting system 100 is shown having a mounting base 110 having two mounting surfaces, an upper mounting surface 120 and a lower mounting surface 115 where solar panels 150 are mounted. Mounting base 110 has openings that are aligned with retained insert nuts 117 which are used to secure a frame clip 135 or a mid-clamp 130. Mid-clamps 130 may be used to provide additional stability but are not required in all installations. A plurality of draining channels 125 are provided in the bottom of mounting base 110 to keep water, ice and other environmental hazards from being trapped and causing damage. Mounting base 110 is made of HDPE (high density polyethylene) and is formed by either a vacuum forming process or by injection molding as is known in the art. Of course other materials may be used such as a workable metal like aluminum or sheet steel using a stamping process. Additionally, other plastics may be used to match specific environmental challenges such as temperature extremes, etc.

Figure 1:
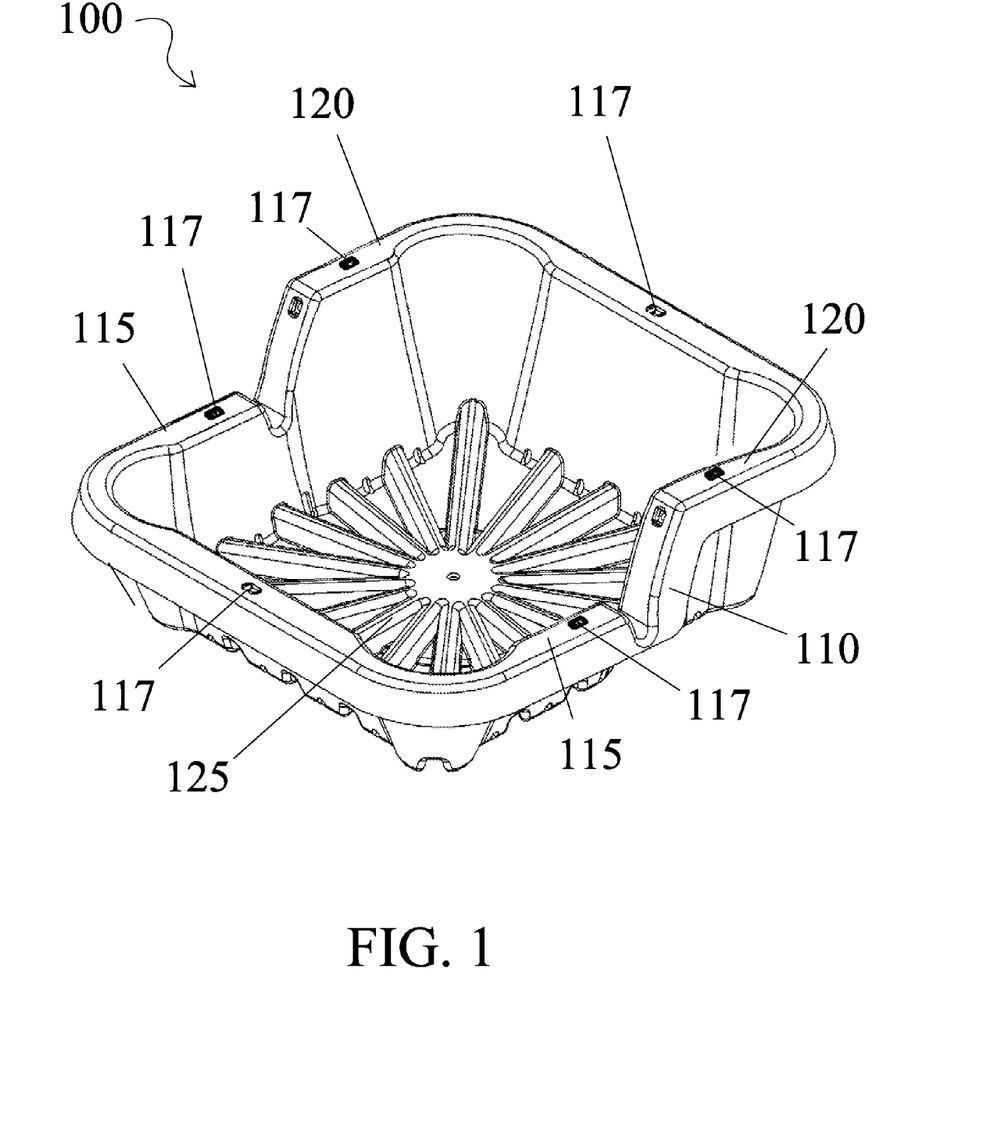
FIG. 1 is a perspective drawing of a solar panel mounting system according to an embodiment of the invention.
Figure 2:
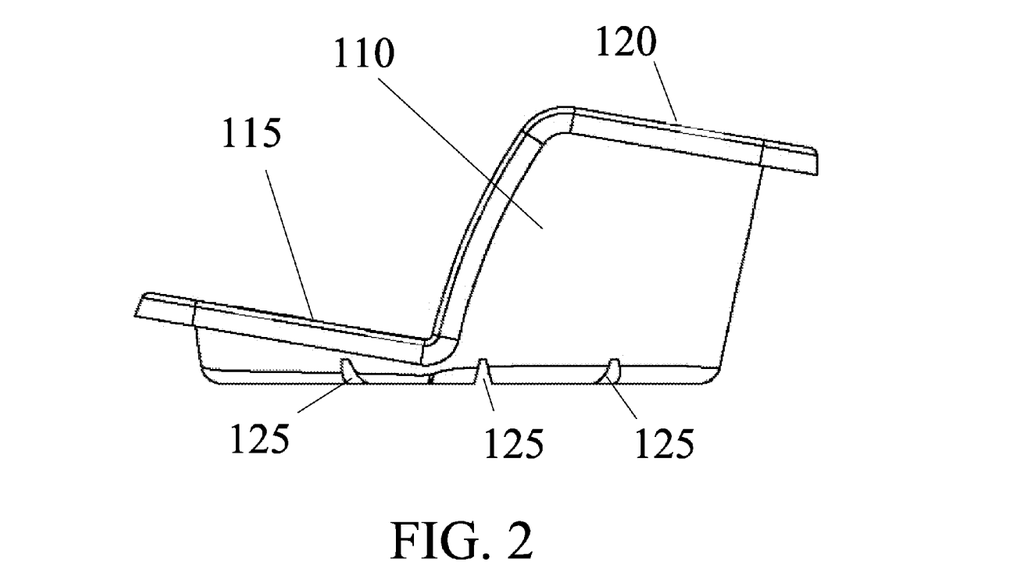
FIG. 2 is a side view of the solar panel mounting system shown in FIG. 1.
Figure 3:
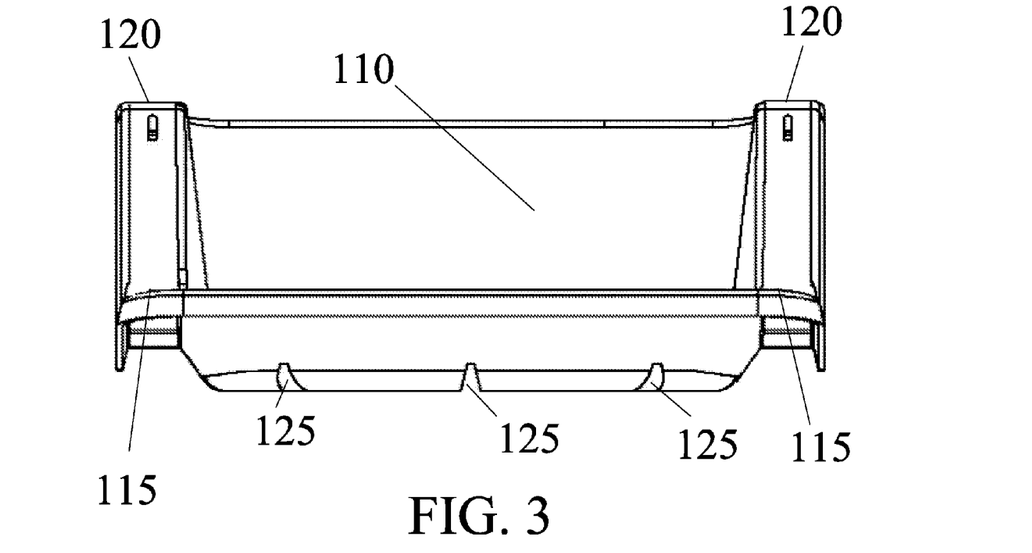
FIG. 3 is a front view of the solar panel mounting system shown in FIG. 1.

Although draining channels 125 are shown radiating out from a central portion of a bottom surface of mounting base 110, other patterns are useable as long as water that gets beneath mounting base 110 and a mounting surface (not shown) can be channeled away to prevent water or ice damage.

Figure 4:
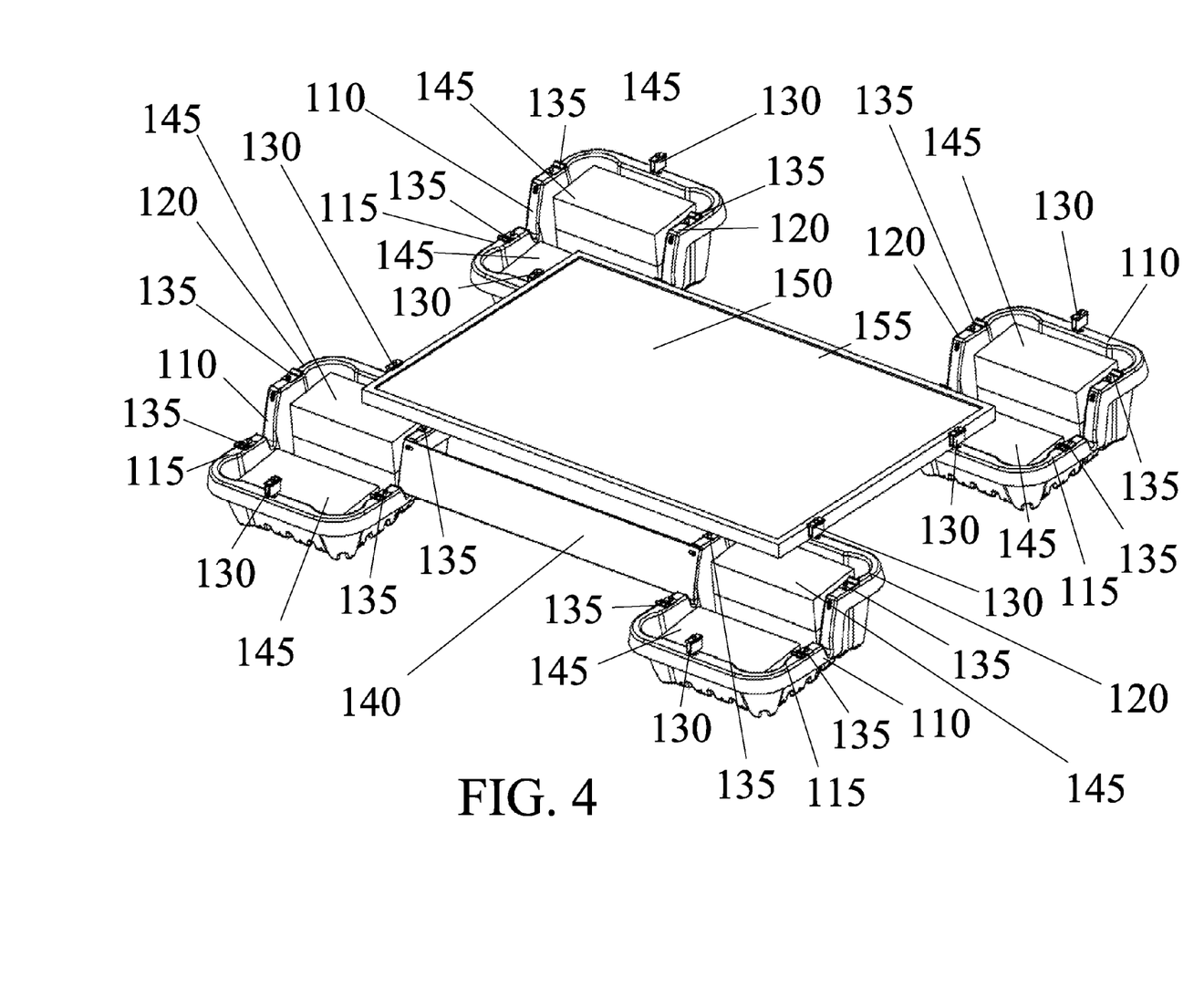
FIG. 4 is a perspective drawing of a typical solar panel module installation according to an embodiment of the present invention.
Figure 5:
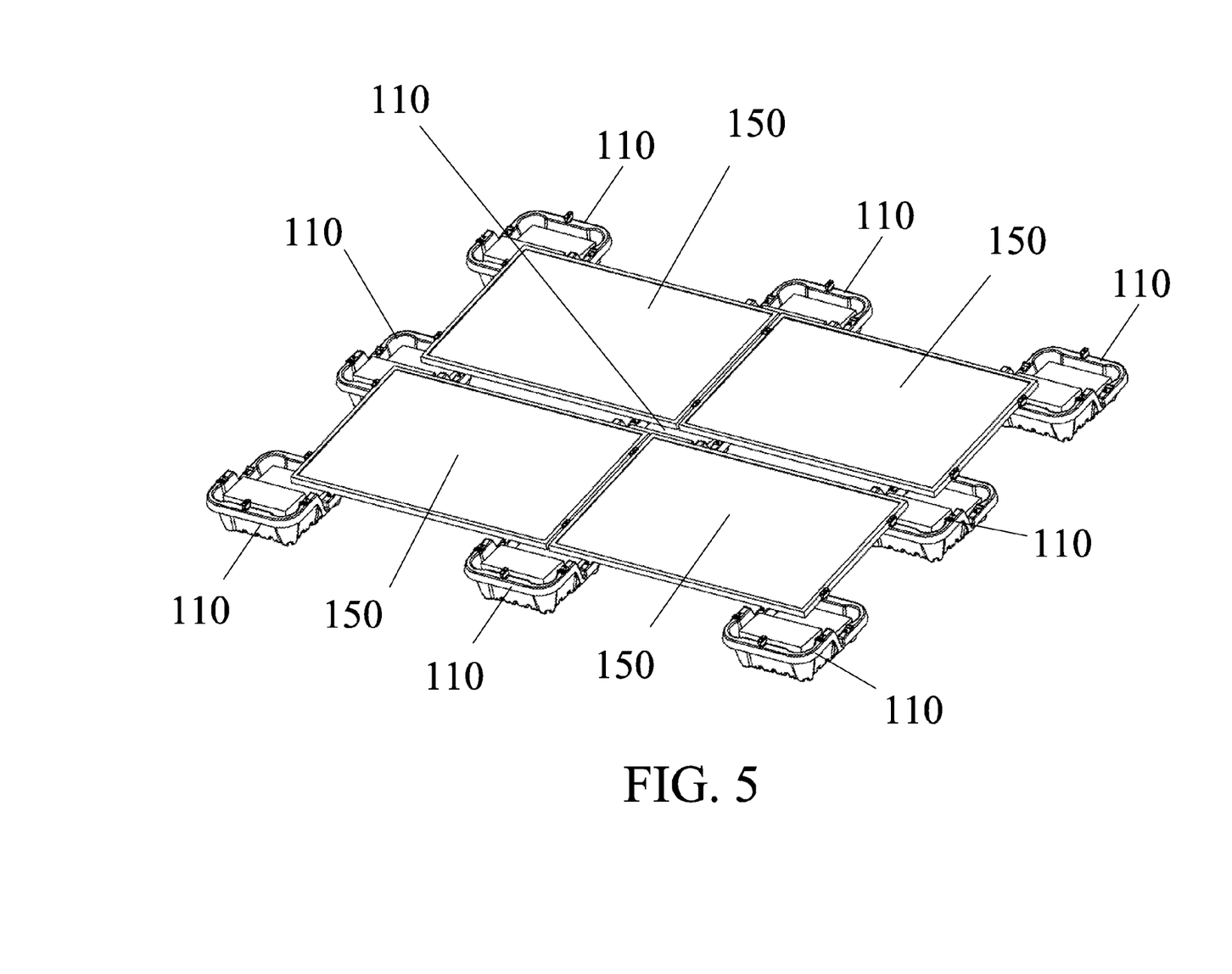
FIG. 5 is a perspective drawing of a typical multi-panel installation according to an embodiment of the invention.

As shown in FIGS. 4 and 5, solar panels 150 are mounted to at least four mounting bases 110 to hold solar panel 150 at the proper angle to maximize solar impingement. One side of solar panel 150 is mounted to an upper mounting surface 120 using frame clip 135 and the other side of solar panel 150 is mounted to lower mounting surface 115 of a mounting base 110. This automatically aligns solar panel 150 to the selected angle which depends on the manufacturing of mounting base 110. The installation angle can be from 0 degrees to over 30 degrees and will depend on where the installation will occur. In geographic areas near the equator, the angle is lower compared to areas North or South of the equator.

Because the solar panel mounting system is modular, to increase the size of the array, simply add more mounting bases 110 and then attach more solar panel modules 150. A plurality of mid-clamps 130 are used to hold solar panel modules 150 securely and attached using insert nut 117 and a fastener. This allows solar panel modules to be attached from the top without having to have access below.

Figure 6:
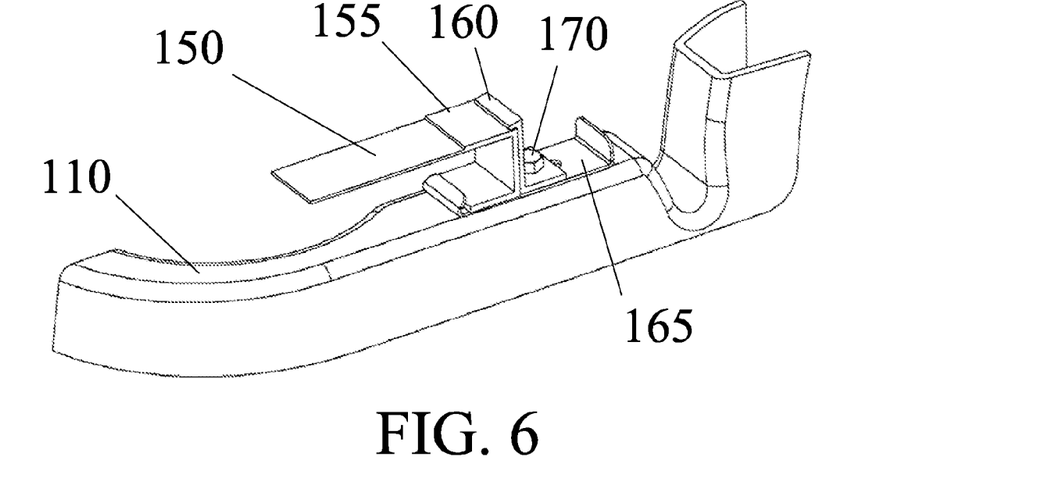
FIG. 6 is a close up perspective view of a top mounting method of securing a solar panel module according to an embodiment of the invention.
Figure 6A:
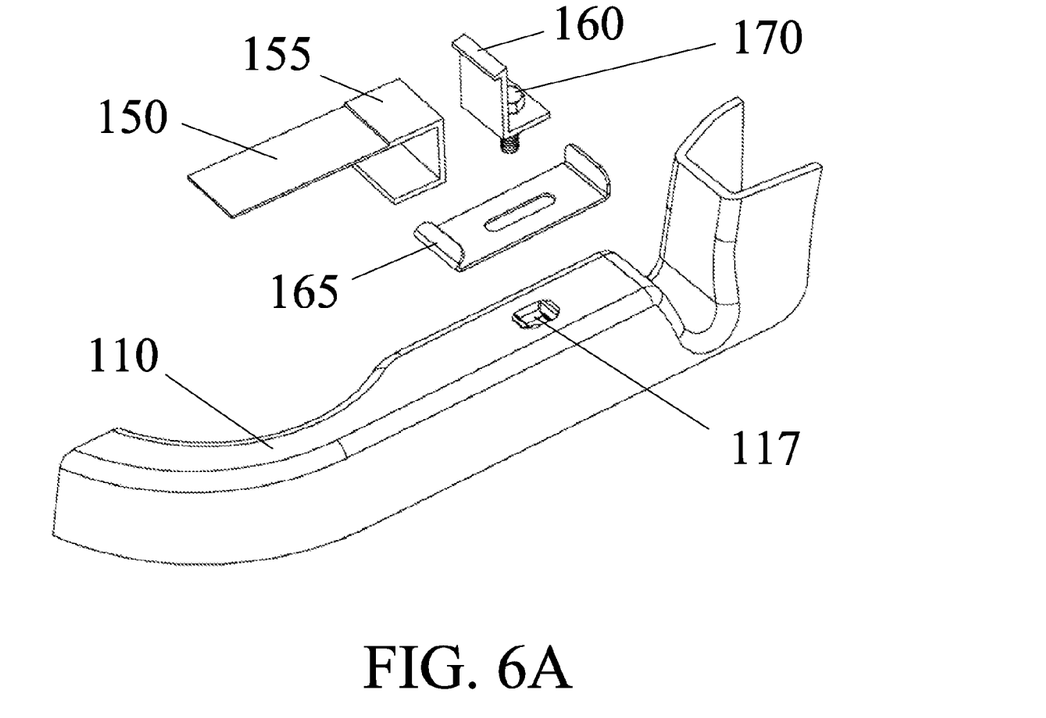
FIG. 6A is an expanded view of the top mounting method of securing a solar panel module shown in FIG. 6.

Referring now to FIGS. 6 and 6A, in the embodiment shown, solar panel 150 has a frame 155 around it that fits within a clamp 160 and a slider clip 165. Slider clip 165 has a clip portion that fits over the bottom edge of frame 155 and then clamp 160 slides up against the outside edge of frame 155 and holds frame 155 against the clip portion of slider clip 165. A top clip portion of clamp 160 fits over the top of frame 155 and is secured using fastener 170 and insert nut 117. As discussed above, all solar panel modules are secured from the top which greatly simplifies the installation and also makes removal much easier than traditional mounting methods. In this embodiment, clamp 160 comes in standard sizes to accommodate selected solar panel modules and different size modules require different size clamps 160.

Figure 7:
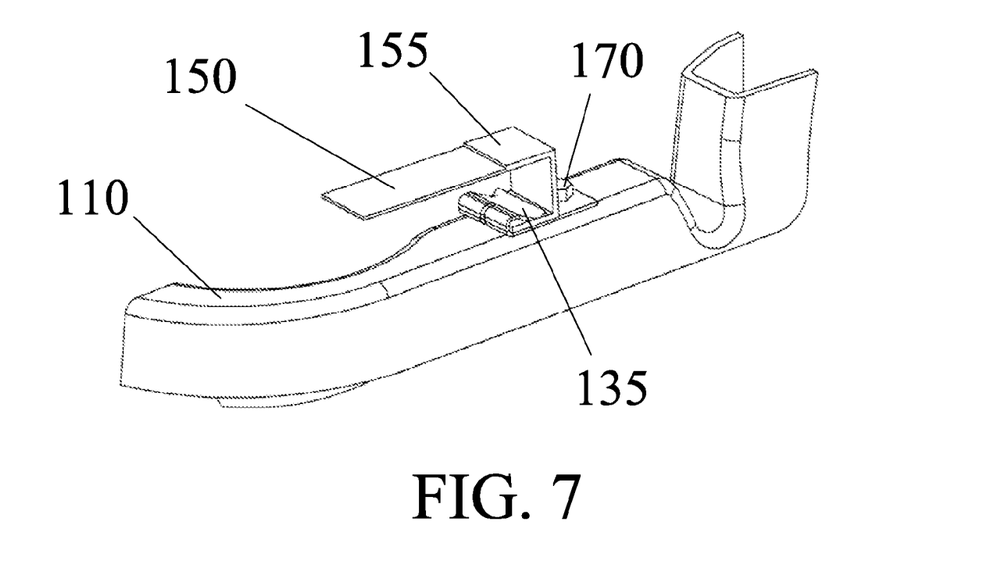
FIG. 7 is a close up perspective view of a top mounting method of securing a solar panel module according to an embodiment of the invention.
Figure 7A:
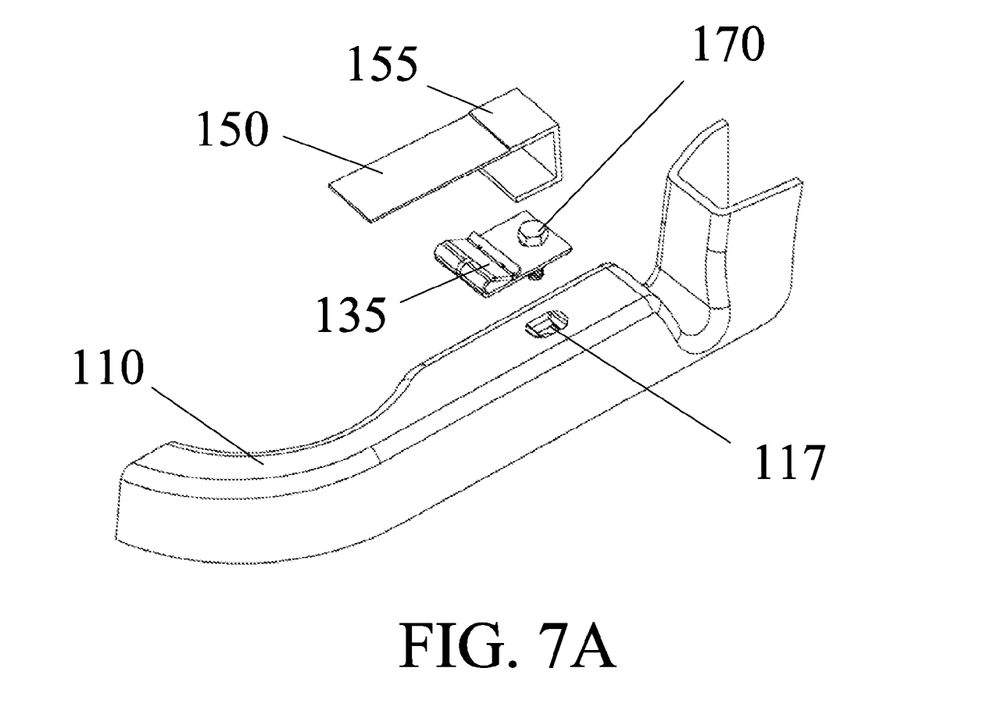
FIG. 7A is an expanded view of the top mounting method of securing a solar panel module shown in FIG. 7.

Now referring to FIGS. 7 and 7A, an alternative embodiment utilizes frame clip 135 which has a biased clip portion that resiliently holds the underside of frame 155 and is then secured using fastener 170 and insert nut 117. This embodiment can be used with all solar panel modules that have a frame regardless of the width.

Referring now to FIGS. 4, mounting bases 110 are shown with a wind screen 140 attached to reduce the aerodynamic pressure and turbulence that may be generated as wind passes over and under solar panel modules 150. Wind screen 140 directs the wind over the top of solar panel modules 150 which helps to hold them down, rather than trying to lift them up from the mounting surface. This embodiment is especially useful in areas subject to windy conditions.

Figure 8:
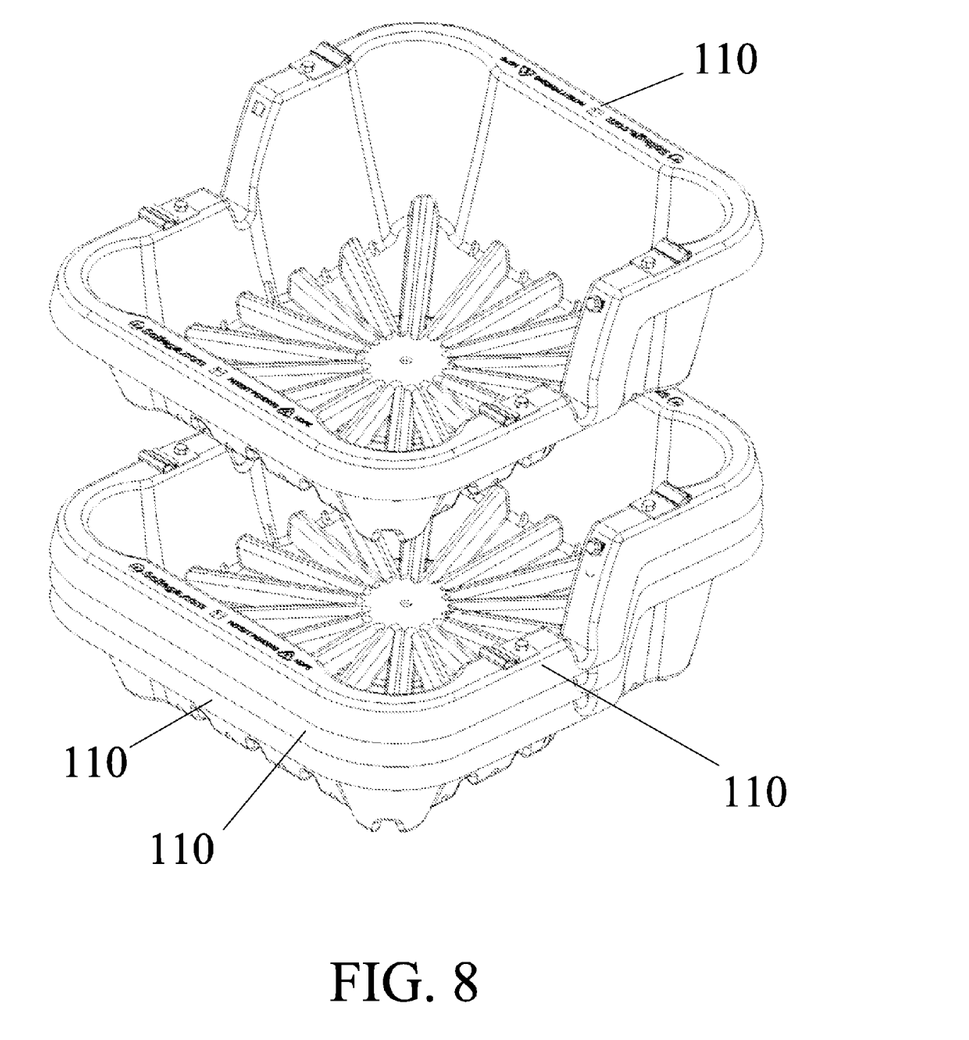
FIG. 8 is a perspective view of a plurality of stacked and nested mounting bases according to an embodiment of the invention.

Referring now to FIG. 8, a plurality of mounting bases 110 are shown in a stacked and nested configuration. This reduces the amount of space needed to transport them and protects them during transit. They are lightweight and are easy to install once at the selected installation site. In transit, all mounting hardware such as frame clips 135, mid-clamps 130, clamp 160 and slider clips 165 may be removed to facilitate stacking. Insert nuts 117 are held in place to facilitate installation.

Figure 9:
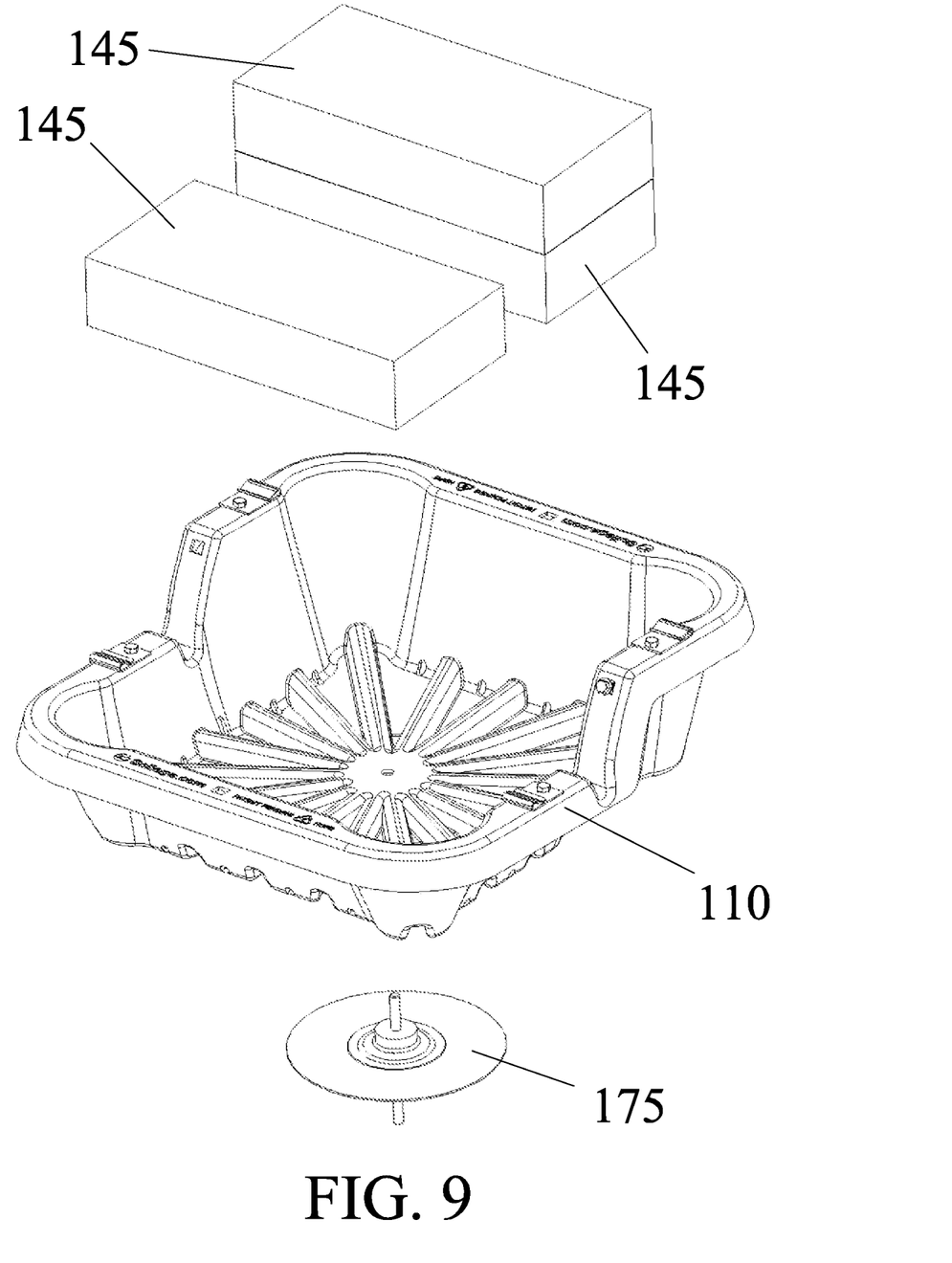
FIG. 9 is a perspective drawing of mounting methods of the mounting base according to an embodiment of the invention.

Referring to FIG. 9, a ballast 145 may be placed in mounting base 110 in installations where no permanent connection is made to the mounting surface (not shown). In another installation method, a roof anchor 175 may be used where roof anchor 175 is mechanically attached to the roof surface (not shown) and then mounting base 110 is secured to roof anchor 175. It is also possible to use a hybrid installation method that includes using both roof anchor 175 and ballast 145 together. Of course other installation methods may be used as long as mounting base 110 is satisfactorily secured to the selected surface. Ballast 145 may be concrete or other material having enough mass to securely hold mounting base 110 in place when exposed to environmental conditions such as wind.

Although the instant invention has been described in relation to particular embodiments thereof, many other variations and modifications and other uses will become apparent to those skilled in the art.

What is claimed is:

1. A solar panel mounting system for mounting solar panel modules having a frame comprises:
    at least four mounting bases;
    each of said four mounting bases having an upper mounting surface and a lower mounting surface; wherein said upper mounting surface and said lower mounting surface being adapted to hold a solar panel module having a frame at an angle therein;
    a plurality of attachment points disposed along a top facing upper edge portion of said mounting bases;
    a clamping means for securing a solar panel module to at least one of said upper mounting surface and said lower mounting surface;
    wherein said clamping means comprises:
        at least one clamp adapted to fit against an outside edge of said frame; and
        at least one slider clip;
        said slider clip having a holding portion and a slotted portion wherein said holding portion fits over a lower portion of said frame; and
        at least one fastener adapted to secure said at least one slider clip through said slotted portion and said at least one clamp wherein said frame is securely held to said mounting base at another attachment point.

2. The solar panel mounting system for mounting solar panel modules having a frame according to claim 1 wherein said clamping means for securing a solar panel module to at least one of said upper mounting surface and said lower mounting surface comprises:
    at least one frame clip having a hook portion that resiliently holds an inside bottom edge of said frame; and
    at least one fastener adapted to secure said at least one frame clip wherein said frame is securely held to said mounting base at another attachment point.

3. The solar panel mounting system for mounting solar panel modules having a frame according to claim 1 wherein said clamping means for securing a solar panel module to at least one of said upper mounting surface and said lower mounting surface further comprises at least one mid-clamp adapted to attach to one of said attachment points.

4. The solar panel mounting system for mounting solar panel modules having a frame according to claim 2 wherein said clamping means for securing a solar panel module to at least one of said upper mounting surface and said lower mounting surface further comprises at least one mid-clamp adapted to attach to one of said attachment points.

5. The solar panel mounting system for mounting solar panel modules having a frame according to claim 1 further comprising a ballast disposed within said mounting base.

6. The solar panel mounting system for mounting solar panel modules having a frame according to claim 5 wherein said ballast is removable.

7. The solar panel mounting system for mounting solar panel modules having a frame according to claim 1 wherein said mounting base has a plurality of channels in a bottom portion therein wherein water is directed along said plurality of channels.

8. The solar panel mounting system for mounting solar panel modules having a frame according to claim 1 wherein said mounting bases are adapted to stack and nest for transport.

* * * * *